(12) United States Patent
Nishigai et al.

(10) Patent No.: US 9,715,288 B2
(45) Date of Patent: Jul. 25, 2017

(54) ELECTRONIC DEVICE

(75) Inventors: Takanobu Nishigai, Ebina (JP); Takashi Miyake, Sagamihara (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/122,632

(22) PCT Filed: May 24, 2012

(86) PCT No.: PCT/JP2012/003403
§ 371 (c)(1),
(2), (4) Date: Nov. 26, 2013

(87) PCT Pub. No.: WO2012/164883
PCT Pub. Date: Dec. 6, 2012

(65) Prior Publication Data
US 2014/0085244 A1    Mar. 27, 2014

(30) Foreign Application Priority Data

May 27, 2011   (JP) .................................. 2011-119395

(51) Int. Cl.
*G06F 3/041* (2006.01)
*G06F 3/0488* (2013.01)

(52) U.S. Cl.
CPC ............ *G06F 3/041* (2013.01); *G06F 3/0414* (2013.01); *G06F 3/0488* (2013.01); *G06F 3/04883* (2013.01); *G06F 2203/04105* (2013.01)

(58) Field of Classification Search
None
See application file for complete search history.

(56) References Cited

U.S. PATENT DOCUMENTS

| 7,683,889 | B2 * | 3/2010 | Rimas Ribikauskas et al. ............... 345/173 |
|---|---|---|---|
| 2010/0225604 | A1 | 9/2010 | Homma et al. |
| 2011/0050629 | A1 * | 3/2011 | Homma et al. ............... 345/174 |
| 2012/0105358 | A1 * | 5/2012 | Momeyer ............. G06F 3/0414 345/174 |
| 2013/0063389 | A1 * | 3/2013 | Moore .......................... 345/174 |

FOREIGN PATENT DOCUMENTS

| JP | H09-269883 | A | 10/1997 | |
|---|---|---|---|---|
| JP | H11-212725 | A | 8/1999 | |
| JP | 2002-213989 | A | 7/2002 | |
| JP | 2002-366277 | A | * 12/2002 | ............... G06F 3/02 |
| JP | 2006-039745 | A | 2/2006 | |
| JP | 2010-211399 | A | 9/2010 | |

(Continued)

OTHER PUBLICATIONS

International Search Report; PCT/JP2012/003403; Jun. 26, 2012.

(Continued)

*Primary Examiner* — Alexander Eisen
*Assistant Examiner* — Kebede Teshome
(74) *Attorney, Agent, or Firm* — Studebaker & Brackett PC

(57) ABSTRACT

The electronic device includes a control unit 10 configured to set in stages a plurality of thresholds which relate to the data based on press and cause a predetermined processing to be executed. The control unit 10 sets the thresholds such that, as the data based on press increases, the difference between thresholds gradually decreases.

14 Claims, 8 Drawing Sheets

(56) References Cited

FOREIGN PATENT DOCUMENTS

JP        2011-034216 A        2/2011

OTHER PUBLICATIONS

Japanese Office Action; JP2012-119736; Jun. 19, 2012 with concise explanation.
An Office Action; "Notice of Reasons for Rejection," issued by the Japanese Patent Office on Jul. 14, 2015, which corresponds to Japanese Patent Application No. 2012-231091 and is related to U.S. Appl. No. 14/122,632; with English language concise explanation.

* cited by examiner

ELECTRONIC DEVICE

CROSS REFERENCE TO RELATED APPLICATION

This application claims priority to and the benefit of Japanese Patent Application No. 2011-119395 filed on May 27, 2011, the entire contents of which are incorporated herein by reference.

FIELD

The present invention relates to an electronic device which detects a press in stages.

BACKGROUND

As a conventional electronic device, there is known a car navigation device that detects a press on a touch panel in multiple stages (see, for example, Patent Document 1). In this car navigation device, as the press on the touch panel of the display unit increases, prefecture names are scrolled starting from the north prefecture on a predetermined display region of the liquid crystal display device of the display unit, and when the press becomes stable (after the predetermined period of time), the selection of the name of the prefecture being displayed can be determined.

CITATION LIST

Patent Document 1: JP2006039745(A)

SUMMARY

In an electronic device configured to detect a press when operation is executed, a press is required to be applied to the device, and thus the burden is imposed on the user. In the electronic device configured to detect a press force in multiple stages as described above, detection of a press for a higher stage requires a press that is larger than that for a lower stage, thus there is an increase in the burden on the user. Patent Document 1 does not describe threshold of a press for each stage when detecting a press for operation.

As a method of reducing such a burden on the user, thresholds for the sequential stages overall may be set to smaller values at even intervals. However, with such a setting, there are concerns that a phenomenon may occur, in which, with only an unintentional light touch by the user, the press is concurrently detected in multiple stages.

The present invention provides an electronic device that reduces the burden on the user and occurrence of malfunction as well.

In order to achieve the above-described object, an electronic device according to the present invention includes a control unit configured to set in stages a plurality of thresholds which relate to data based on press and cause a predetermined processing to be executed, and the control unit sets the plurality of thresholds such that, as the data based on press increases, the difference between thresholds gradually decreases.

According to one embodiment of the present invention, the control unit sets the thresholds for a second and higher stages based on the number of stages for a plurality of thresholds set in stages according to the application and a predetermined threshold for a first stage.

Further, in another embodiment of the present invention, the control unit sets the thresholds for remaining stages except for the threshold for the highest stage among the stages based on the number of stages for a plurality of thresholds set in stages according to the application and a maximum threshold set previously as a threshold for the highest stage.

Moreover, an electronic device according to another aspect of the present invention includes a control unit configured to set in stages a plurality of thresholds which relate to data based on press and being used for a predetermined processing, and the control unit sets the plurality of thresholds such that, as the data based on press decreases, the difference between thresholds gradually decreases.

In one embodiment of the present invention, the control unit sets the thresholds for a second and lower stages based on the number of stages for a plurality of thresholds set in stages according to the application and a predetermined threshold for a first stage.

Further, in another embodiment of the present invention, the control unit sets the thresholds for remaining stages except for the threshold for the lowest stage among the stages based on the number of stages for a plurality of thresholds set in stages according to the application and a minimum threshold previously set as a threshold for the lowest stage.

Moreover, an electronic device according to another aspect of the present invention includes:

a control unit configured to respectively set in stages a plurality of first sets of thresholds which relate to data based on press and cause a predetermined processing to be executed when the data is equal to or more than the threshold, and set in stages a plurality of second sets of thresholds which relate to data based on press and cause a predetermined processing to be executed when the data is equal to or less than the threshold, in stages, and the control unit sets the first sets of thresholds such that, as the data based on press increases, the difference between the first sets of thresholds gradually decreases; and the second sets of thresholds such that, as the data based on press decreases, the difference between the seconds sets of thresholds gradually decreases.

The present invention may reduce the burden on the user and occurrence of malfunction as well.

DESCRIPTION OF EMBODIMENTS

The embodiment of the electronic device according to the present invention is described below in details with reference to drawings.

First Embodiment

Figure 1:
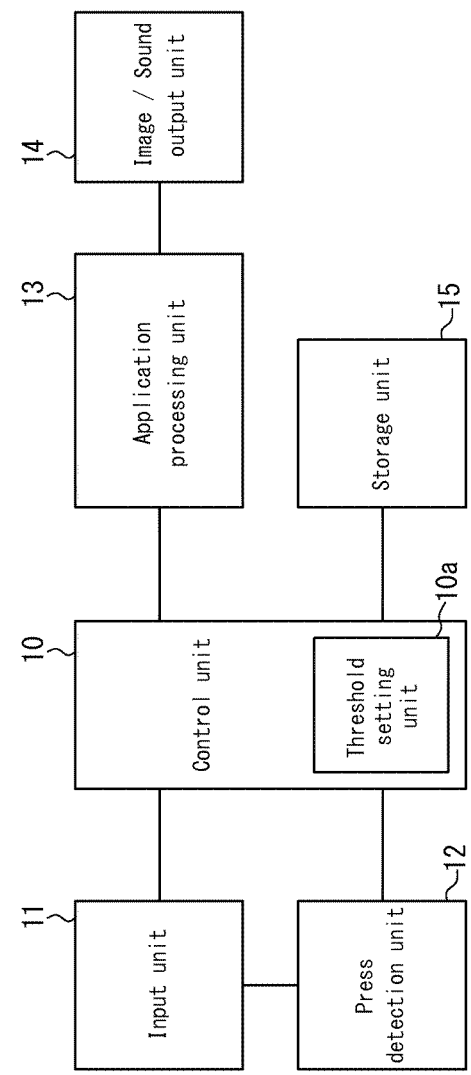
FIG. 1 is a function block diagram illustrating a schematic configuration of a part of an electronic device according to a first embodiment of the present invention.

FIG. 1 is a function block diagram illustrating a schematic configuration of a part of an electronic device according to a first embodiment of the present invention. The electronic device illustrated in FIG. 1 includes a control unit 10, an input unit 11, a press detection unit 12, an application processing unit 13, an image/sound output unit 14 and a storage unit 15.

The input unit 11 includes, for example, a touch panel, which is pressed by the user to operate images, sound and movement of characters output from the image/sound output unit 14. The information input by the user's operation is transmitted to the control unit 10. Further, the press by the user's operation is transmitted to the press detection unit 12.

The press detection unit 12 detects a press when the user operates the input unit 11, and is configured using, for example, elements such as a strain gauge sensor or a piezoelectric element whose physical or electrical characteristics (strain, resistance, voltage, etc.) vary according to the press. When the press detection unit 12 is configured using, for example, a piezoelectric element and the like, the piezoelectric element of the press detection unit 12 undergoes a change in the magnitude of voltage, which is electrical characteristics (voltage value (hereinafter referred to as data based on press)), in accordance with the magnitude of load (force) (or a speed of changing the magnitude of load (force) (acceleration)) applied on a press onto the input unit 11. Then the control unit 10 controls, when the data based on press is equal to or more than the predetermined threshold, such that the predetermined processing is executed based on, for example, the application and the like.

When the press detection unit 12 notifies the control unit 10 of the data based on press, or when the control unit 10 detects the data based on press by the press detection unit 12, the control unit 10 obtains the data based on press. That is, the control unit 10 obtains the data based on press to the input unit 11 from the press detection unit 12. The data based on press may, instead of a voltage value, be the magnitude of load on a press, an electrical power value, a resistance value and the like. The press detection unit 12 may be integrated with a function unit (tactile sensation providing unit) that produces a vibration to provide a tactile sensation to the user's finger and the like. When the press detection unit 12 and the tactile sensation providing unit are configured using a piezoelectric element, the piezoelectric element may be shared by these units, thus a press detection unit and tactile sensation providing unit may be configured. This is because the piezoelectric element generates a voltage when a pressure is applied thereto, and deforms when a voltage is applied. In addition, the electronic device illustrated in FIG. 1 may include a separate tactile sensation providing unit to provide a tactile sensation to the user's finger and the like. In this case, the tactile sensation providing unit is vibrated in response to the load detected by the press detection unit 12, and thus the user pressing the input unit 11 sensuously recognizes that an operation has been executed.

The press detection unit 12 may be configured in accordance with the touch detection type of the input unit 11. For example, when the input unit 11 is a resistive film type, the magnitude of resistance according to the touch region or the range of changing the magnitude of resistance and the like is associated with the load (force) on press to the touch face of the touch panel, and thus the press detection unit 12 can be configured without using a strain gauge sensor, a piezoelectric element and the like. Alternatively, when the input unit 11 is a capacitive type, the magnitude of capacitance (electrical charge) or the range of changing the magnitude of capacitance (electrical charge) and the like is associated with load (force) on press to the touch panel, and thus the press detection unit 12 can be configured without using a strain gauge sensor, a piezoelectric element and the like.

The tactile sensation providing unit may be configured, when the magnitude of voltage (voltage value (data)) of the piezoelectric element that also serves as a press detection unit satisfies the predetermined threshold, to produce a vibration by driving the piezoelectric element. In this case, "when the magnitude of voltage (voltage value (data)) of the piezoelectric element satisfies the predetermined threshold" may be when the voltage value (data) reaches the predetermined reference value, when the voltage value (data) exceeds the predetermined reference value, or when a voltage value (data) that is equal to the predetermined reference value is detected.

The application processing unit 13 executes an application processing based on the instruction from the control unit 10, and outputs the processing results to the image/sound output unit 14. In this case, the application processing includes, for example, a processing related to image, sound, movement of characters and the like such as, for example, image quality adjustment, sound volume adjustment, calculation of display position of character dynamic image and the like, and the processing results are output from the image/sound output unit 14.

The storage unit 15, illustrated as one storage unit for the sake of convenience, represents a memory or memories required for operating the electronic device, such as a memory for storing thresholds related to data based on press and are used for causing the predetermined processing to be executed, a work memory for the control unit 10, a program storage memory for operating the electronic device and the like. The number of stages of a plurality of thresholds set in stages according to the application is stored in the storage unit 15. In the present embodiment, the threshold Pth1 for the first stage related to the data based on press detected in multiple stages is set previously and stored. The Pth1 may be set common to all applications, and may be set as a fixed value or changeably as appropriate by the user. The maximum value dmax and the minimum value dmin of the difference between thresholds when a press is detected in multiple stages are previously stored in the storage unit 15.

Here, the above-mentioned maximum value dmax may be set to the smallest value among, for example, the upper limit value of press that can be applied to the input unit 11 or to the press detection unit 12, the upper limit value of press that can be detected by the press detection unit 12, and the maximum value of difference between thresholds for the stages relating to data based on press when the user executes operations. The minimum value dmin may be set to the largest value among, for example, the lower limit value of press that may be detected by the press detection unit 12 and the minimum value of difference between thresholds for the stages relating to data based on press when the user performs operations.

The control unit 10 controls the whole operation of the electronic device. In addition, the control unit 10 determines the processing to be executed according to the information that is input from the input unit 11 and/or the data based on press detected by the press detection unit 12, and commands the application processing unit 13 to execute the determined processing at the application processing unit 13. Further, the control unit 10 includes a threshold setting unit 10a configured to set, at the start of execution of an application, based on the application, a plurality of thresholds in stages, the threshold being related to the data based on press and being used for executing a predetermined processing.

In the present embodiment, the threshold setting unit 10a sets thresholds such that, as the data based on press increases, the difference between thresholds gradually decreases. The thresholds set by the threshold setting unit 10a are stored in the storage unit 15.

For the sake of convenience, FIG. 1 illustrates each block separated by function, but configuration is not limited thereto. For example, the input unit 11 and the press detection unit 12 may be integrated, and the integrated input unit and press detection unit may be used as an input means. Further, the input unit 11, the press detection unit 12 and the sound output unit of the image/sound output unit 14 may be integrated as a touch panel. Moreover, the application processing unit 13 and/or the image/sound output unit 14 may be provided in an externally connected device, so that the electronic device only performs detection of a user operation and determination of processing.

The application processing unit 13 may be provided in the control unit 10. Or, the control unit 10 may be configured as software executed on any suitable processor such as CPU (Central Processing Unit), or configured using special processors dedicated to each processing (e.g. DSP (Digital Signal Processor)). Thus, for example, the processing unit configured to determine a processing to be executed according to the data based on press and the threshold setting unit 10a configured to execute a setting processing of a plurality of thresholds set in stages according to the application may be configured using a special processor dedicated to each processing.

Next, the processing executed by the electronic device according to the present embodiment is described with reference to the flowchart illustrated in FIG. 2.

First, in step S11, the control unit 10 determines, when detecting that the input unit 11 is operated by the user and the application is selected, the selected application based on the information sent from the input unit 11 and executes a booting process. According to the selected application, the control unit 10 reads out from the storage unit 15 the number of stages for a plurality of thresholds set in stages and the threshold for the first stage.

Next, in step S12, the control unit 10 calculates, based on the number of stages for a plurality of thresholds set in stages and the threshold for the first stage read out from the storage unit 15 in step 11, the estimated thresholds for each stage at the threshold setting unit 10a. In this case, with the total number of stages being S and the threshold for the first stage being Pth1, estimated thresholds for the second and higher stages P(N) (N=2, 3, . . . , S) are calculated as $P(N)=P(N-1)+P1\times(1/2)^{N-1}$, where Pth1=P1, for example.

Next, in step S13, the control unit 10 reads out the specified maximum value dmax and minimum value dmin of the difference between thresholds from the storage unit 15, then, by the threshold setting unit 10a, determines whether or not each difference between the thresholds for each stage according to the estimated thresholds for each stage calculated in step S12 is within the range of the maximum value dmax to the minimum value dmin. As a result thereof, when all of the differences between estimated thresholds are within the range of the maximum value dmax to the minimum value dmin, the estimated thresholds for the calculated second and higher stages are set as thresholds used by the application and stored in the storage unit 15.

Figure 3:
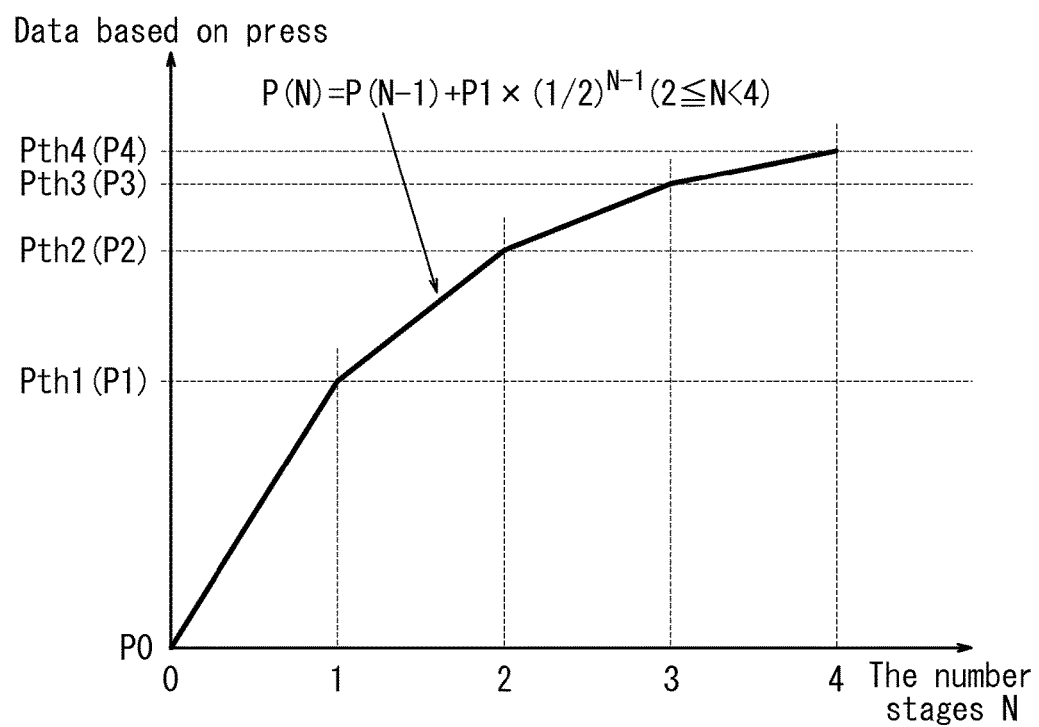
FIG. 3 is a diagram illustrating an example of setting of thresholds in multiple stages according to the first embodiment.

For example, when the total number of stages S for a plurality of thresholds set in stages is "4," if each of the differences between estimated thresholds for the stages according to the threshold Pth1 for the first stage and the estimated thresholds for the second and higher stages, P2, P3 and P4 calculated in step S12 is within the range of the minimum value dmin to the maximum value dmax, the calculated estimated thresholds P2, P3 and P4 are stored in the storage unit 15 as specified thresholds Pth2, Pth3 and Pth4. Therefore, in this case, as illustrated in FIG. 3, the estimated thresholds P2, P3 and P4 are respectively equal to the thresholds Pth2, Pth3 and Pth4 stored in the storage unit 15.

Figure 4:
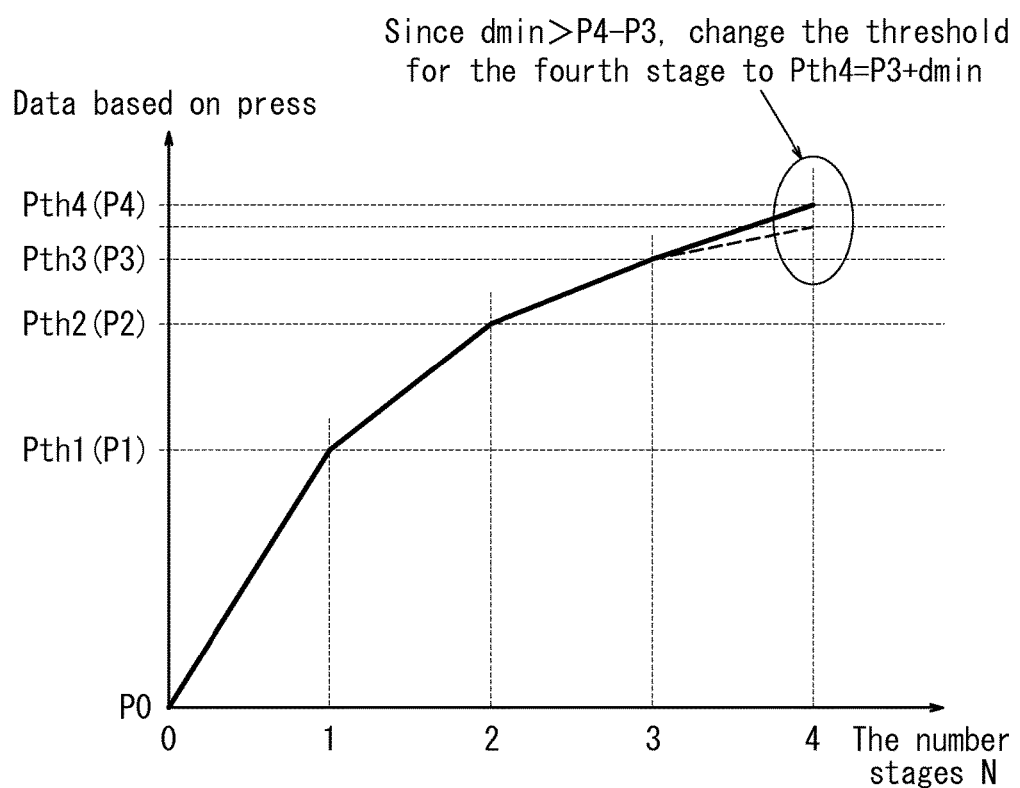
FIG. 4 is a diagram illustrating another example of setting of thresholds in multiple stages according to the first embodiment.

On the other hand, when the difference between estimated thresholds related to the calculated estimated threshold for the highest stage is smaller than the minimum value dmin, that is, for example, in the above-described example, as illustrated in FIG. 4, when only the difference between the estimated thresholds P3 and P4 is such that dmin>P4−P3, the threshold setting unit 10a sets the threshold Pth for the fourth stage to, for example, Pth4=P3+dmin, and stores it in the storage unit 15.

Then, in step S14, when a press by the user's operation of the input unit 11 is detected by the press detection unit 12, the control unit 10 determines which of the thresholds that have been set for each stage is smaller than the data based on press Pdet. As a result, when Pdet<Pth1, the control unit 10 determines that the press by the user is insufficient, that is, the user does not intentionally perform operation of pressing, and detection of a press by the press detection unit 12 is continued.

Figure 5:
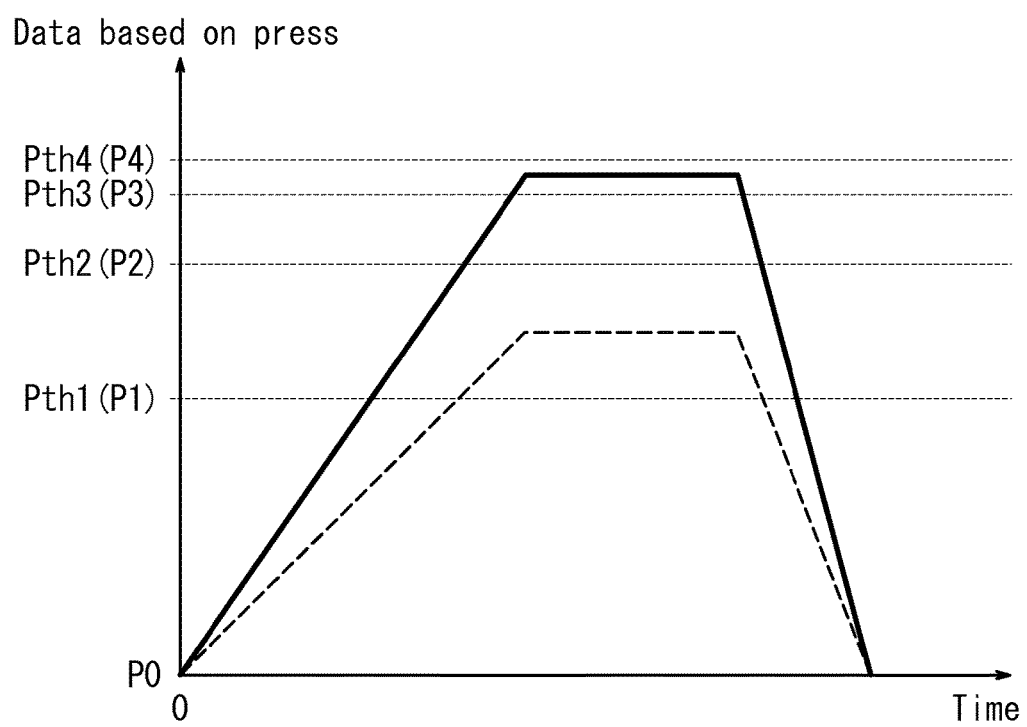
FIG. 5 is a diagram illustrating variations of press detected by a press detection unit of FIG. 1.

On the other hand, when Pth1≤Pdet<Pth2 is satisfied for the predetermined period of time, the control unit 10 determines that the data based on press is equal to or more than the threshold for the first stage, and the process moves to S15-1, or, when Pth2≤Pdet<Pth3 is satisfied for the predetermined period of time, the control unit 10 determines that the data based on press is equal to or more than the threshold for the second stage, and the process moves to step S15-2. Further, when Pth3≤Pdet<Pth4 is satisfied for the predetermined period of time, the control unit 10 determines that the data based on press is equal to or more than the threshold for the third stage, and the process moves to S15-3, or, when Pth4≤Pdet is satisfied for the predetermined period of time, the control unit 10 determines that the data based on press is equal to or more than the threshold for the fourth stage, and the process moves to step 515-4. FIG. 5 illustrates an example of variations of the data based on press, Pdet, detected by the press detection unit 12 when the data based on press is determined to be equal to or more than the threshold for the first stage, with the dashed line, and an example of variations of the data based on press, Pdet, detected by the press detection unit 12 when the data based on press is determined to be equal to or more than the threshold for the third stage, with the solid line. That is, in the present embodiment, the threshold setting unit 10a sets a plurality of thresholds in stages, the thresholds being related to the data based on press and being used for executing a predetermined processing when the data is equal to or more than the threshold.

In addition, in step S15-1, the control unit 10 causes the application processing unit 13 to execute an application processing corresponding to the threshold for the first stage. Further, in step S15-2, the control unit 10 causes the application processing unit 13 to execute an application processing corresponding to the threshold for the second stage. In a similar manner, in step S15-3, the control unit 10 causes the application processing unit 13 to execute an application processing corresponding to the threshold for the third stage, and in step S15-4, the control unit 10 causes the application processing unit 13 to execute an application processing corresponding to the threshold for the fourth stage.

Then, in step S16, the control unit 10 outputs the result of the application processing executed in any one of steps S15-1 to S15-4 to the image/sound output unit 14.

Thus, in the present embodiment, the threshold setting unit 10a sets the thresholds for the second and higher stage, based on the number of stages for a plurality of thresholds set in stages according to the application to be executed and the predetermined threshold for the first stage, such that, as the data based on press increases, the difference between thresholds decreases. Thus the burden on the user who operates the input unit 11 can be reduced and occurrence of malfunction can be reduced as well.

Second Embodiment

In the electronic device according to the second embodiment of the present invention, in the configuration illustrated in FIG. 1, instead of the threshold Pth1 for the first stage when a press is detected in multiple stages, the maximum threshold Pthmax corresponding to the threshold for the highest stage when a press is detected in multiple stages is previously set and stored in the storage unit 15. The maximum threshold Pthmax is set, for example, in a similar manner as the maximum value dmax of the difference between thresholds, and is set, for example, to Pthmax≤dmax.

Figure 2:
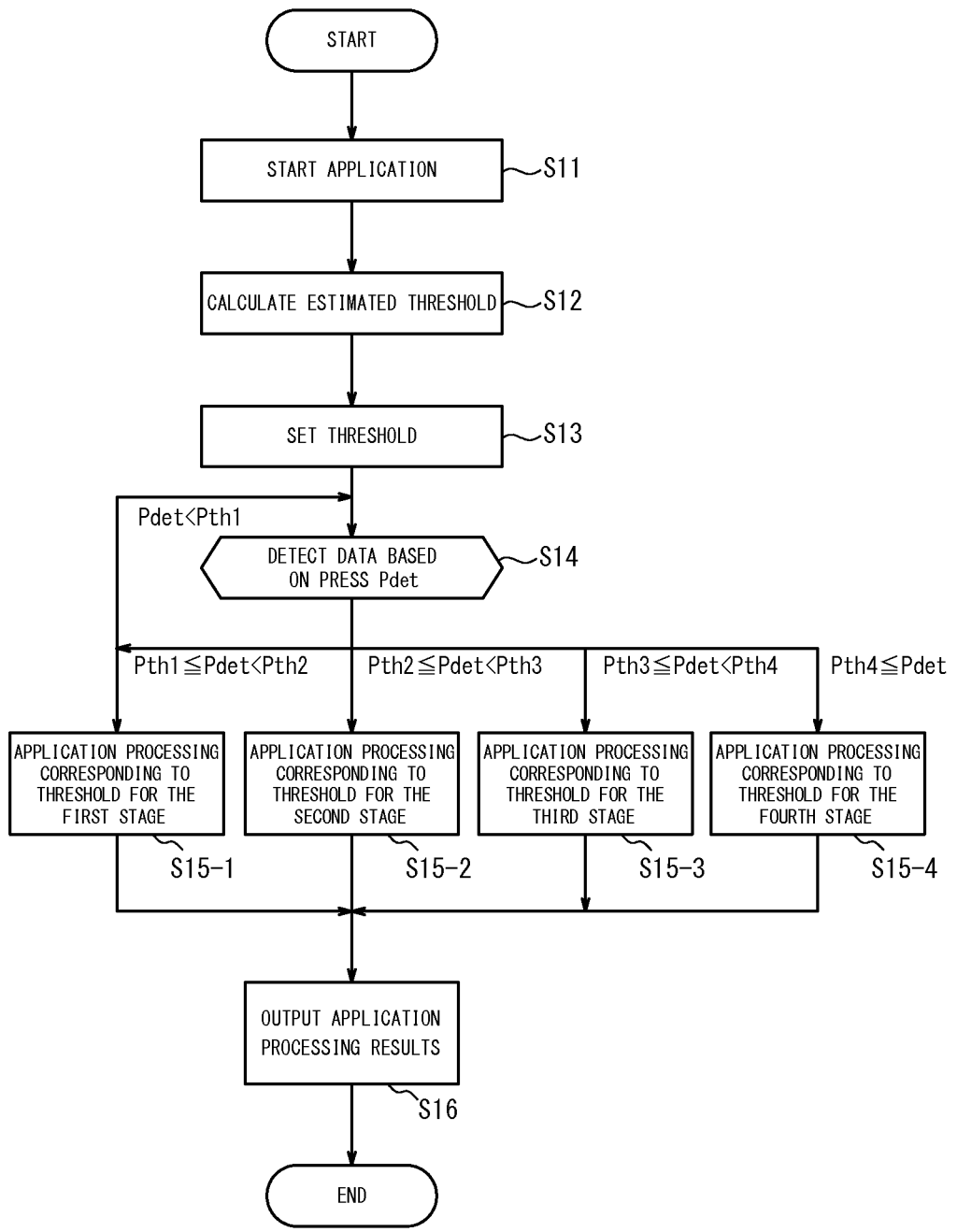
FIG. 2 is a flowchart illustrating a processing of the electronic device of FIG. 1.

In step 11 in FIG. 2, the control unit 10 reads out, in synchronization with execution of the start processing of the application selected by the user, the maximum threshold Pthmax and the number of stages S for a plurality of thresholds set in stages according to the application, from the storage unit 15.

Next, in step S12 in FIG. 2, the control unit 10 calculates, based on the maximum threshold Pthmax and the number of stages S for a plurality of thresholds set in stages that are read out from the storage unit 15 in step S11, the estimated threshold P(N) for each stage. In this case, the estimated threshold P(N) for each stage is calculated from, for example, $P(N)=Pthmax \times [1-t(t-1)/\{S(S+1)\}]$, where $t=S, \ldots, 2, 1$ corresponds to $N=1, 2, \ldots, S$.

Then, in step S13 in FIG. 2, the control unit 10 reads out, as in the case of the first embodiment, the maximum value dmax and the minimum value dmin of the difference between thresholds from the storage unit 15, and determines whether or not each of the differences between the estimated thresholds for each stage according to the calculated estimated threshold P(N) for each stage is within the range of the maximum value dmax to the minimum value dmin. As a result thereof, when all of the differences between the estimated thresholds are within the range of the maximum value dmax to the minimum value dmin, the estimated thresholds P(N) for each stage except for the maximum threshold Pthmax are set as thresholds used by the application and stored in the storage unit 15.

Figure 6:
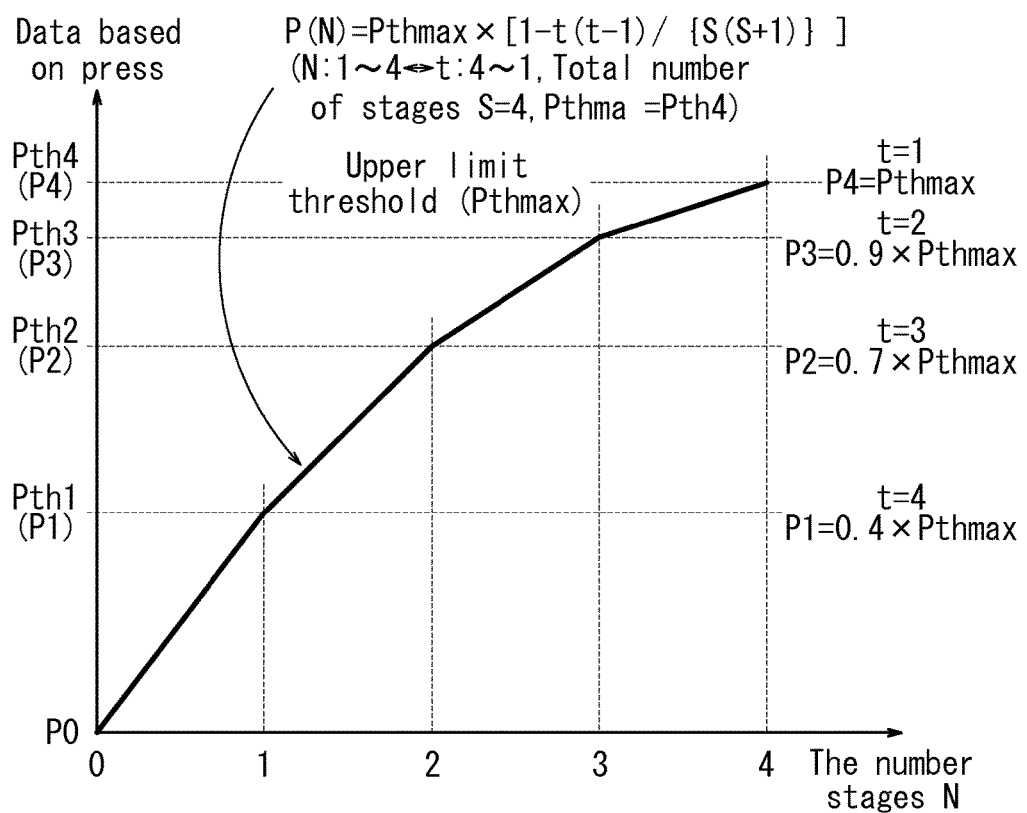
FIG. 6 is a diagram illustrating an example of setting of thresholds in multiple stages according to a second embodiment.

For example, when the total number of stages S for a plurality of thresholds set in stages is "4," if each of the differences between estimated thresholds for the stages according to the estimated thresholds for stages P2, P3 and P4 calculated in step S12 and the predetermined maximum threshold Pthmax (in this case, Pth4) is within the range of the minimum value dmin to the maximum value dmax, the calculated estimated thresholds P1, P2 and P3 are set respectively as thresholds Pth1, Pth2 and Pth3 and stored in the storage unit 15. Therefore, in this case, as illustrated in FIG. 6, the estimated thresholds P1, P2 and P3 are respectively equal to the thresholds Pth1, Pth2 and Pth3 stored in the storage unit 15.

On the other hand, when the difference between estimated thresholds related to the calculated estimated threshold for the highest stage is smaller than the minimum value dmin, that is, for example, in the above-described example, when only the difference between the estimated thresholds P3 and P4 is dmin>P4−P3, the threshold for the third stage Pth3 is set to be lower than the calculated estimated threshold P3 to satisfy Pth4−Pth3>dmin, and is stored in the storage unit 15.

Then, as in the case of the first embodiment, the control unit 10 executes processes on and after step S14 of FIG. 2.

Thus, in the present embodiment, the threshold setting unit 10a sets, based on the number of stages for a plurality of thresholds set in stages according to the application to be executed and the maximum threshold that is previously set as the threshold for the highest stage among the stages, the thresholds from the first stage to the highest stage, such that, as the press increases, the difference between thresholds gradually decreases. Thus, the burden on the user during pressing operation of the input unit 11 can be reduced and occurrence of malfunction can be reduced as well.

Third Embodiment

In the configuration illustrated in FIG. 1, in order to execute a processing corresponding to the operation in which the operator gradually increases a press, thresholds are set such that, as the data based on press increases, the difference between thresholds gradually decreases. In the electronic device according to the third embodiment of the present invention, in order to execute a processing corresponding to the operation in which the operator gradually decreases a press, in the configuration illustrated in FIG. 1, thresholds are set such that, as the data based on press decreases, the difference between thresholds gradually decreases. Such thresholds are set by the threshold setting unit 10a and stored in the storage unit 15.

In the present embodiment, the threshold setting unit 10a sets a plurality of thresholds in stages, the thresholds being related to the data based on press and are used to execute predetermined processing when the data is equal to or less than the threshold. Further, as in the case of the first embodiment, in the present embodiment, the number of stages for a plurality of thresholds set in stages according to the application and the threshold Pth1 for the first stage relating to the data based on press detected in multiple stages are previously set and stored in the storage unit 15. In addition, the maximum value dmax and minimum value dmin of the difference between the thresholds when a press is detected in multiple stages are also previously stored in the storage unit 15.

Figure 7:
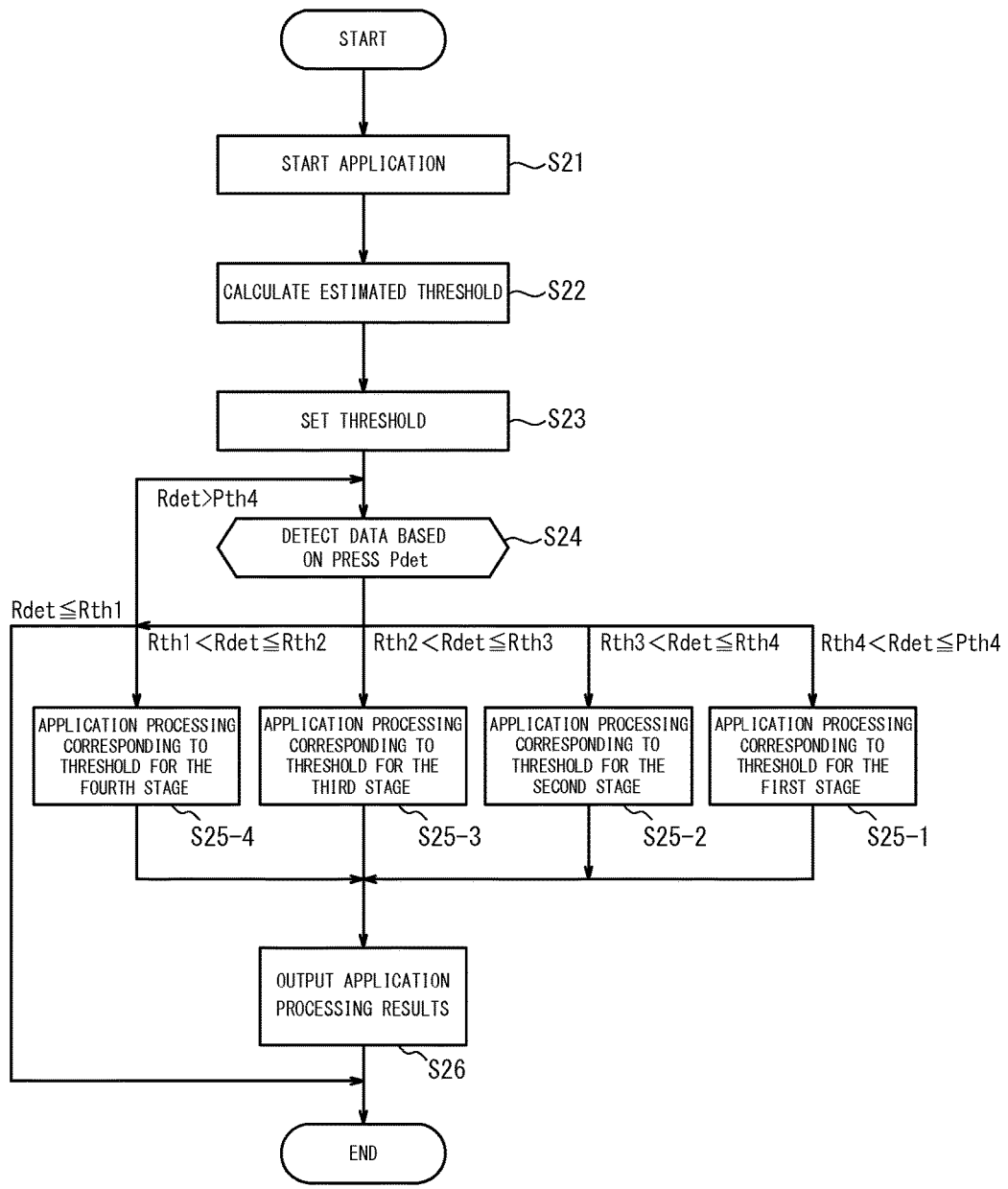
FIG. 7 is a flowchart illustrating a processing of an electronic device according to a third embodiment.

Next, the processing executed by the electronic device according to the present embodiment is described with reference to the flowchart illustrated in FIG. 7.

Steps S21 to S24 illustrated in FIG. 7 correspond respectively to steps S11 to S14 illustrated in FIG. 2, and thus only different points will be focused on and described below.

In step S22, the control unit 10 calculates, based on the number of stages for a plurality of thresholds set in stages and the threshold for the first stage read out from the storage unit 15 in step S21, the estimated thresholds P(N) for each stage at the threshold setting unit 10a. In this case, with respect to estimated thresholds for the stages, provided that the total number of stages is S and the threshold for the first stage is Rth4, the estimated thresholds P(N) (N=2, 3, ..., S) for the second and higher stages are calculated from $R(N)=P4-R(N-1)-R1\times(1/2)^{N-1}$, where Rth4=SR1, or P4 is a predetermined value. In this case, the predetermined value P4 may be previously set as appropriate in consideration of the press required for executing an operation based on the application, or may be a value that is set based on a press when the user's press turns from increase to decrease.

Then, the threshold setting unit 10a determines whether or not each of the differences between the estimated thresholds for each stage according to the estimated thresholds for each stage calculated in step S22 is within the range of the maximum value dmax to the minimum value dmin. As a result, if all of the differences between estimated thresholds are within the range of the maximum value dmax to the minimum value dmin, the calculated estimated thresholds for the second and lower stages are set as the thresholds used by the application and stored in the storage unit 15.

Figure 8:
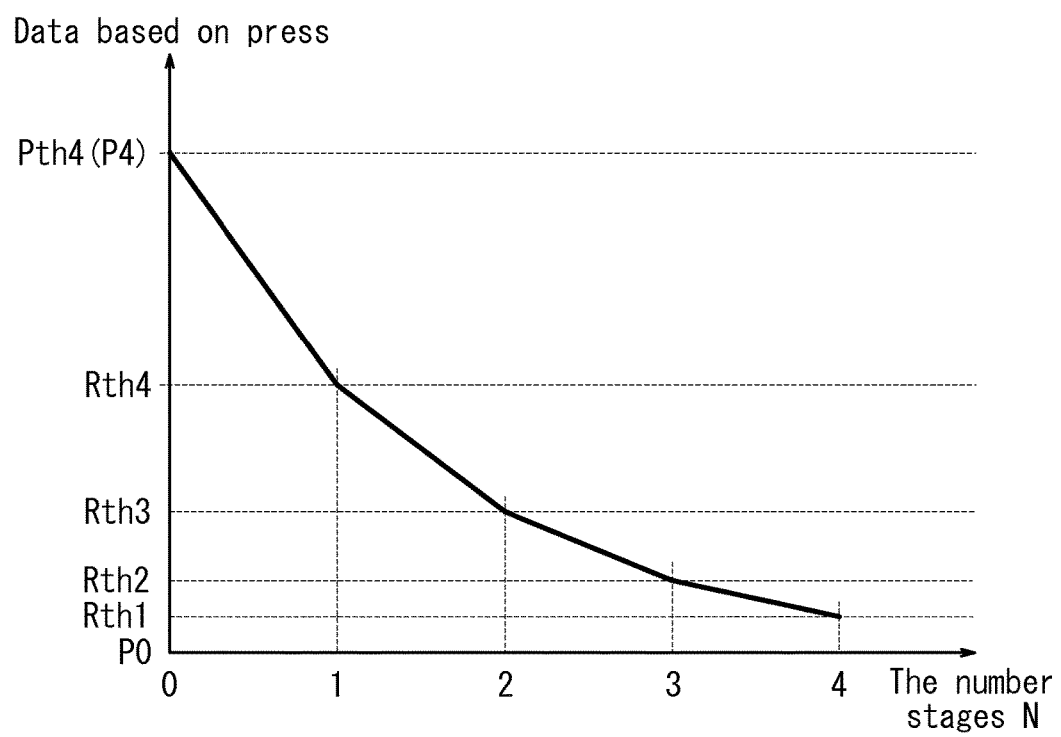
FIG. 8 is a diagram illustrating an example of setting of thresholds in multiple stages according to the third embodiment.

For example, when the total number of stages of a plurality of thresholds set in stages is "4," if each of the differences between estimated thresholds for each stage according to the threshold Rth4 for the first stage and the estimated thresholds for the second and lower stages calculated in step S22 is within the range of the minimum value dmin to the maximum value dmax, the calculated estimated thresholds are respectively set as specified thresholds Rth3, Rth2 and Rth1 and stored in the storage unit 15. Thus, in this case, the thresholds as illustrated in FIG. 8 are set as specified thresholds, Rth3, Rth2 and Rth1.

On the other hand, when the difference between estimated thresholds related to the calculated estimated threshold for the lowest stage is smaller than the minimum value dmin, that is, for example, when only the difference between the threshold Rth2 for the third stage and the threshold Rth1 for the fourth stage is smaller than dmin, the threshold setting unit 10a sets the threshold Rth1 for the fourth stage to, for example, Rth1=Rth2−dmin, and stores it in the storage unit 15. The threshold for each stage set in this manner is preferably set so as not to be equal to or less than zero, since the press that is smaller than zero cannot be detected, and when the press detected by the press detection unit 12 is zero, a tactile sensation cannot be provided to the user's finger by, for example, the tactile sensation providing unit.

Then, in step S24, when the press detection unit 12 detects a press when the input unit 11 is operated by the user, the control unit 10 determines which of the predetermined thresholds for each stage is greater than the data based on press, Rdet. As a result thereof, when Rdet>Pth4, it is determined that a press by the user does not decrease, and detection of a press by the press detection unit 12 is continued.

On the other hand, when Rth4<Rdet≤Pth4 is satisfied for the predetermined period of time, it is determined that the data based on press is equal to or less than the threshold for the first stage and the process moves to step S25-1, then when Rth3<Rdet≤Rth4 is satisfied for the predetermined period of time, it is determined that the data based on press is equal to or less than the threshold for the second stage and the process transits to step S25-2. Further, when Rth2<Rdet≤Rth3 is satisfied for the predetermined period of time, it is determined that the data based on press is equal to or more than the threshold for the third stage and the process moves to step S25-3, and when Rth1<Rdet≤Rth2 is satisfied for the predetermined period of time, it is determined that the data based on press is equal to or more than the threshold for the fourth stage and the process moves to step S25-4. That is, in the present embodiment, the threshold setting unit 10a sets a plurality of thresholds in stages, the threshold being related to the data based on press and being used for executing a predetermined process when the data is equal to or less than the threshold. Further, when Rdet≤Rth1, it is determined that the press by the user has been cancelled, that is, the user's finger and the like is released from the input unit 11, and the process is ended.

Thus, in the present embodiment, the threshold setting unit 10a sets a plurality of thresholds in stages, the threshold being related to the data based on press and being used for executing a predetermined process when the data is equal to or less than the thresholds. Further, in the present embodiment, the threshold setting unit 10a sets thresholds such that, as the data based on press increases, the difference between the thresholds gradually decreases. Thus the burden on the user during pressing operation of the input unit can be reduced and occurrence of malfunction can be reduced as well.

The present invention is not limited to the above-described embodiments, and various modifications and changes may be made. For example, the arithmetic expression for calculating the estimated thresholds may be changed as appropriate according to the application. Further, the maximum value and the minimum value of the differences between thresholds for the stages related to the data based on press when operation is performed by the user may differ according to the user's condition or the application. Therefore, the maximum value dmax and the minimum value dmin of the difference between thresholds when a press is detected in multiple stages may be changed by the user as appropriate.

Moreover, in the first embodiment, for example, when only the difference between the estimated thresholds P3 and P4 does not satisfy dmin, the fourth threshold Pth4 for the fourth stage is set to Pth4=P3+dmin. However, as in the case of the second embodiment, the threshold Pth3 for the third stage may be corrected to be lower than the calculated estimated threshold P3 to satisfy Pth4−Pth3>dmin.

Further, in order to prevent the electronic device from being damaged by press of the input unit 11 with an excessive press, an upper limit threshold may be provided to the threshold related to the data based on press to prevent damages and, in the processing on and after step S14 in FIG. 2, when the detected data based on press, Pdet, exceeds the upper limit threshold, alert may be given to the user through images and sounds from the image/sound output unit 14.

Furthermore, in the above-described each embodiment, the application process corresponding to the threshold for each stage may be executed when the data based on press reaches the threshold for the stage, or when the data based on press exceeds the threshold for the stage. In a similar manner, in the third embodiment, a predetermined processing is executed when the data based on press is equal to or less than the predetermined threshold. However, the predetermined processing may be executed when the data based on press is less than the predetermined threshold.

The above-described each embodiment may be executed separately, and all or a part of the first to the third embodiments may be combined as appropriate. For example, with respect to the threshold related to the data based on press, a part of the first embodiment and a part of the third embodiment may be combined and a processing may be executed by setting a set of thresholds with respect to each of the increasing direction and the decreasing direction of the data based on press.

Moreover, in the above-described third embodiment, based on the same concept as that of the second embodiment, instead of the threshold Pth1 for the first stage when a press is detected in multiple stages, the minimum threshold Pthmin corresponding to the threshold for the lowest stage when a press is detected in multiple stages may be previously set and stored in the storage unit 15. The minimum threshold Pthmin may be set in a similar manner to the minimum value dmin of the difference between thresholds, for example, and may be set to Pthmin≥dmin, for example. That is, in this case, the threshold setting unit 10a sets thresholds for the stages except for that for the lowest stage, based on the number of stages for a plurality of thresholds set in stages according to the application and the minimum threshold previously set as the threshold for the lowest stage among the stages.

REFERENCE SIGNS LIST

10 control unit
10a threshold setting unit
11 input unit
12 press detection unit
13 application processing unit
14 image/sound output unit
15 storage unit

The invention claimed is:

1. An electronic device comprising:
a control unit configured to set in stages a plurality of thresholds which relate to data based on press and cause a predetermined processing to be executed, wherein
the control unit controls the plurality of thresholds such that, as the data based on press increases, a difference between the thresholds gradually decreases,
the control unit estimates and sets the thresholds for a second and higher stages based on the number of stages for the plurality of thresholds set in stages according to a plurality of applications and a predetermined threshold for a first stage,
the thresholds differ between the applications,
at least one of the plurality of applications comprises application processing related to image, sound or movement of characters
a first application and a second application have the same predetermined threshold for the first stage,
the first application and the second application have different thresholds for an other stage which are each estimated and set using the predetermined threshold for the first stage, and
the first application and the second application have different processings each according to the different thresholds for the other stage.

2. The electronic device according to claim 1, wherein the control unit sets the thresholds for stages except for the threshold for the highest stage among the stages based on the number of stages for a plurality of thresholds set in stages according to the plurality of applications and a maximum threshold that is previously set as a threshold for the highest stage.

3. An electronic device comprising:
a control unit configured to set in stages a plurality of thresholds which relate to data based on press and cause a predetermined processing to be executed, wherein
the control unit sets the plurality of thresholds such that, as the data based on press decreases, a difference between the thresholds gradually decreases,
the control unit estimates and sets the thresholds for a second and lower stages based on the number of stages for the plurality of thresholds set in stages according to a plurality of applications and a predetermined threshold for a first stage,
the thresholds differ between the applications,
at least one of the plurality of applications comprises application processing related to image, sound or movement of characters,
a first application and a second application have the same predetermined threshold for the first stage,
the first application and the second application have different thresholds for an other stage which are each estimated and set using the predetermined threshold for the first stage, and
the first application and the second application have different processings each according to the different thresholds for the other stage.

4. The electronic device according to claim 3, wherein the control unit sets the thresholds for stages except for the threshold for the lowest stage among the stages based on the number of stages for the plurality of thresholds set in stages according to the plurality of applications and a minimum threshold set previously as a threshold for the lowest stage.

5. An electronic device comprising:
a control unit configured to set in stages a plurality of first sets of thresholds which relate to data based on press and cause a predetermined process to be executed when the data is equal to or more than the threshold, and set in stages a plurality of second sets of thresholds which related to data based on press and cause a predetermined process to be executed when the data is equal to or less than the threshold, wherein
the control unit sets the first sets of thresholds such that, as the data based on press increases, the difference between the first sets of thresholds gradually decreases,
as the data based on press decreases, the difference between the second sets of thresholds gradually decreases,
the control unit estimates and sets the first sets of thresholds for a second and higher stages based on the number of stages for the plurality of first sets of thresholds set in stages according to a plurality of applications and a predetermined threshold for a first stage for the first sets of thresholds,
the control unit estimates and sets the second sets of thresholds for a second and lower stages based on the number of stages for the plurality of second sets of thresholds set in stages according to the plurality of applications and a predetermined threshold for a first stage for the second sets of thresholds,
the thresholds differ between the applications,
at least one of the plurality of applications comprises application processing related to image, sound or movement of characters, a first application and a second application have the same predetermined threshold for the first stage, the first application and the second application have different thresholds for an other stage which are each estimated and set using the predetermined threshold for the first stage, and the first application and the second application have different processings each according to the different thresholds for the other stage.

6. The electronic device according to claim 1, wherein the application processing comprises image quality adjustment, sound volume adjustment, or calculation of display position of character dynamic image.

7. The electronic device according to claim 1, further comprising:

an output unit operatively connected to the control unit, wherein processing results of the application processing are output from the output unit.

8. The electronic device according to claim 3, wherein the application processing comprises image quality adjustment, sound volume adjustment, or calculation of display position of character dynamic image.

9. The electronic device according to claim 3, further comprising:

an output unit operatively connected to the control unit, wherein processing results of the application processing are output from the output unit.

10. The electronic device according to claim 5, wherein the application processing comprises image quality adjustment, sound volume adjustment, or calculation of display position of character dynamic image.

11. The electronic device according to claim 5, further comprising:

an output unit operatively connected to the control unit, wherein processing results of the application processing are output from the output unit.

12. The electronic device according to claim 1, wherein the plurality of thresholds are set by a user every time the electronic device is used.

13. The electronic device according to claim 3, wherein the plurality of thresholds are set by a user every time the electronic device is used.

14. The electronic device according to claim 5, wherein the plurality of thresholds are set by a user every time the electronic device is used.

* * * * *